(12) United States Patent
Böhm

(10) Patent No.: US 9,272,750 B2
(45) Date of Patent: Mar. 1, 2016

(54) DRIVE ARRANGEMENT FOR A BICYCLE, HAVING A GREATER DIFFERENCE IN THE NUMBER OF TEETH BETWEEN THE LARGEST AND THE SMALLEST REAR CHAIN SPROCKET

(71) Applicant: SRAM Deutschland GmbH, Schweinfurt (DE)

(72) Inventor: Robert Böhm, Mainberg (DE)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 295 days.

(21) Appl. No.: 13/847,700

(22) Filed: Mar. 20, 2013

(65) Prior Publication Data

US 2014/0128191 A1 May 8, 2014

(30) Foreign Application Priority Data

Mar. 20, 2012 (DE) .................. 10 2012 204 452

(51) Int. Cl.
| | |
|---|---|
| *F16H 9/24* | (2006.01) |
| *B62M 1/36* | (2013.01) |
| *B62M 9/126* | (2010.01) |

(52) U.S. Cl.
CPC .............. *B62M 1/36* (2013.01); *B62M 9/126* (2013.01); *F16H 9/24* (2013.01)

(58) Field of Classification Search
CPC ............ F16H 9/24; B62M 1/36; B62M 9/126
USPC ...................................... 474/80, 82
See application file for complete search history.

(56) References Cited

U.S. PATENT DOCUMENTS

| | | | |
|---|---|---|---|
| 3,583,249 A | 6/1971 | Morse | |
| 3,748,916 A | 7/1973 | Morse | |
| 4,530,677 A | 7/1985 | Nagano | |
| 4,895,553 A | 1/1990 | Nagano | |
| 5,540,118 A | 7/1996 | Calendrille, Jr. | |
| 2005/0218623 A1 | 10/2005 | Oishi et al. | |
| 2006/0058135 A1* | 3/2006 | Shahana | 474/82 |
| 2007/0021246 A1* | 1/2007 | Shahana et al. | 474/82 |
| 2007/0202977 A1* | 8/2007 | Watarai et al. | 474/82 |
| 2009/0137354 A1* | 5/2009 | Oseto et al. | 474/82 |
| 2009/0247334 A1* | 10/2009 | Takachi et al. | 474/82 |
| 2009/0291789 A1* | 11/2009 | Ishikawa et al. | 474/82 |
| 2014/0018199 A1* | 1/2014 | Shahana et al. | 474/82 |
| 2014/0087901 A1* | 3/2014 | Shipman et al. | 474/82 |

FOREIGN PATENT DOCUMENTS

| | | |
|---|---|---|
| EP | 2 022 713 A2 | 2/2009 |
| EP | 2 106 995 A1 | 10/2009 |
| FR | 926822 | 10/1947 |

(Continued)

*Primary Examiner* — Michael Mansen
*Assistant Examiner* — Robert T Reese
(74) *Attorney, Agent, or Firm* — Milan Milosevic; Lisa Serdynski

(57) ABSTRACT

A drive arrangement for a bicycle including a chainring having a chainring axis, a plurality of different rear sprockets, the plurality of rear sprockets sharing a sprocket axis, a drive chain that runs around the rear sprockets and the chainring and in meshing engagement with a selected active sprocket of the plurality of rear sprockets and the chainring, and a rear derailleur. The rear derailleur is configured to shift the chain over a plurality of sprockets having a difference in tooth count of over 25 teeth ranging from a smallest to a largest sprocket.

23 Claims, 7 Drawing Sheets

(56) References Cited

FOREIGN PATENT DOCUMENTS

| | | | |
|---|---|---|---|
| FR | 2 496 587 | A1 | 6/1982 |
| FR | 2 541 225 | A1 | 8/1984 |
| FR | 2 610 062 | A1 | 7/1988 |
| GB | 861607 | | 2/1961 |

* cited by examiner

DRIVE ARRANGEMENT FOR A BICYCLE, HAVING A GREATER DIFFERENCE IN THE NUMBER OF TEETH BETWEEN THE LARGEST AND THE SMALLEST REAR CHAIN SPROCKET

BACKGROUND OF THE INVENTION

A drive arrangement for a bicycle is known, for example, from U.S. Pat. No. 3,748,916. This known drive arrangement describes a rear chain guide. The rear chain guide has a chain guide roller that is disposed, with reference to an active sprocket, tangential to a next-larger inactive sprocket, in order to improve the shifting process. In the sense of the present application, a chain guide roller that is positioned by the chain guide closer to the sprocket is the chain guide roller off which the drive chain, rotating in the drive direction, last runs before it runs onto the active rear sprocket as viewed in the direction of the sprocket axis.

BRIEF SUMMARY OF THE INVENTION

The present invention relates to a drive arrangement for a bicycle. The drive arrangement includes a front chainring that can rotate about a chainring axis. A plurality of coaxial rear chain sprockets is provided having different diameters and different numbers of teeth. A drive chain runs about the chain sprockets and the front chainring and is in meshing engagement with a selected active sprocket out of the plurality of coaxial rear sprockets and with the front chainring. A rear derailleur is provided with a chain guide through which the drive chain passes. The chain guide of the derailleur can be moved relative to the rear chain sprockets, in the direction of their common sprocket axis, in order to select the desired active sprocket from among the plurality of rear sprockets by means of this axial relative movement. The guide has a tensioning device with two chain guide rollers having chain guide roller axes that are essentially parallel to one another and to the common sprocket axis. The derailleur has a base part that is fixed in place with reference to the sprocket axis, and a movable member articulated relative to the base part so as to allow relative movement, by means of a parallelogram four-pivot articulation. The chain guide is disposed on the movable member so as to pivot about a tensioning pivot axis that is different from the chain guide roller axes and parallel to the chain guide roller axes, and is biased by a chain tensioning moment that acts around the tensioning pivot axis. The four articulation axes of the parallelogram four-pivot articulation are oriented, independent of the selected relative position of the tensioning derailleur, relative to the plurality of rear chain sprockets, orthogonal to their common sprocket axis.

It is an aspect of the present invention to provide a drive arrangement for a bicycle in which the drive chain can be shifted between rear chain sprockets that demonstrate a greater or larger difference in the number of teeth between the largest and their smallest sprockets.

For reliable and reproducible shifting at the rear chain sprockets, in other words for shifting the drive chain from an active chain sprocket that is currently in meshing engagement with the drive chain to a currently inactive destination sprocket that is to be active in the future, it is advantageous if the free chain section between the chain guide roller that is closer to the sprocket (i.e., a first guide roller) and the rear chain sprocket is not too long. Otherwise, an axial movement of the rear derailleur parallel to the common sprocket axis of the rear chain sprockets tends to lead to curvature of the chain rather than to shifting it from an active sprocket to an adjacent inactive destination sprocket. Likewise, this free chain length should not be too short. Otherwise, the drive chain, which is usually configured as a roller chain, with inner and outer plates, acts like a rigid solid body. In this condition, the rear derailleur may jam the free chain piece between the first chain guide roller and the sprocket, instead of shifting the chain to an adjacent chain sprocket.

In this connection, a shifting process in which the drive chain is supposed to be shifted from an active sprocket to an inactive chain sprocket that is larger in diameter is particularly problematic, because the chain must rise from the currently active sprocket to the inactive chain sprocket having the larger diameter.

It is therefore contemplated by the present invention to provide a drive arrangement in which the free chain length between the first chain guide roller and the active sprocket that is currently in meshing engagement with the drive chain is essentially constant for all the sprockets.

If the free chain length is constant for all the sprockets, essentially the same shifting behavior is made available for the entire arrangement of rear chain sprockets. The shifting behavior is independent of which one of the sprockets is currently active.

A person skilled in the art can then determine this free chain length by means of corresponding placement of the rear chain guide on the bicycle or by means of appropriate dimensioning of the same, in such a manner that it is optimal for the selected drive arrangement. In each instance, the optimal free chain length between the first chain guide roller and each active sprocket will be essentially the same for all rear chain sprockets and therefore also optimal.

This task is accomplished, according to the invention, by means of a drive arrangement of the stated type, in which a first distance between the chain guide roller axis of the first guide roller and the tensioning pivot axis is shorter than a second distance between a second chain guide roller axis and the tensioning pivot axis. Also, a first connection plane, which contains the first chain guide roller axis and the tensioning pivot axis, encloses an angle with a second connection plane, which contains the second chain guide roller axis and the tensioning pivot plane, of 50° to 85°, preferably of 55° to 75°, particularly preferably of 55° to 65°, and most preferably of 55° to 60°.

The parallelogram four-pivot articulation (also referred herein as a linkage) connects a base part of the rear chain guide with a movable member. The movable member and therefore the chain guide (which may also be referred to herein as a tensioning device) is articulated onto the movable member as explained above. Both are displaced essentially along a trajectory that is parallel to the common sprocket axis. The rear chain guide is moved relative to the rear sprockets, as desired by the bicyclist.

It is true with the selected linkage that as movement occurs between the base part and the movable member, no purely axial trajectory over a specific axial movement range is possible. The movable member will always demonstrate an unavoidable radial movement component, as well. However, the axial movement component of the trajectory of the movable member predominates in the case of relative adjustment of the tensioning derailleur relative to the rear chain sprockets, on the basis of the selected orientation of the articulation axes of the linkage.

In this connection, it is beneficial that length equalization can be implemented with a movable member having a chain cage articulated onto it for tensioning of the drive chain. The movable member can be moved primarily parallel to the sprocket axis on the basis of the linkage disposed in between, relative to the base part of the rear chain guide fixed on the chain sprockets. This is possible even in the case of rear chain sprockets having a greater difference in the number of teeth between the largest and the smallest sprockets, in such a manner that the free chain length between the first chain guide roller and the active sprocket remains essentially constant over all the rear chain sprockets. Therefore, the constancy of the free chain length is brought about primarily by means of a pivoting movement of the chain guide.

This can be achieved, for one thing, where the constant distance between the first chain guide roller axis and the tensioning pivot axis is shorter than the constant distance between the second chain guide roller axis and the tensioning pivot axis. The distance between the first chain guide roller axis and the tensioning pivot axis determines the adjustment capacity of the rear chain guide, because the first chain guide roller axis can be brought so close to the active rear sprocket, in each instance, to achieve the desired constant free chain length.

The constant distance between the second chain guide roller axis and the tensioning pivot axis is a dimension causing the rear chain guide to accommodate, essentially "store," chain length in the rear chain guide. This chain accommodation capacity is a consequence of the distance between the chain guide rollers and their ability to be pivoted about the tensioning pivot axis. By means of pivoting of the tensioning device about the tensioning pivot axis, looping of the drive chain around the second chain guide roller furthermore changes, so that the second chain guide roller also contributes to the chain accommodation capacity discussed here.

Because the second distance is selected to be greater than the first distance, the basic prerequisite is created, that the rear chain guide can accommodate sufficient chain length while maintaining the tension of the drive chain, if the rear chain sprocket that has the least teeth and is smallest in diameter is the active sprocket. Furthermore, in this way it is ensured that sufficient chain length can be released by the rear chain guide if the rear chain sprocket that has the most teeth and is largest in diameter is selected as the active chain sprocket.

With the simplified assumption of an approximately constant angle at which the drive chain loops around the rear chain sprockets, the difference in chain length that is in meshing engagement with a sprocket approximately corresponds to the difference in the radii between the largest and the smallest sprocket, multiplied by the looping angle in radian measure.

In this connection, secure chain guidance between the two chain guide rollers, with a simultaneous sufficient accommodation capacity of the rear chain guide for accommodation of chain lengths exists if the connection planes indicated above, between the tensioning pivot axis and the individual chain guide roller axes, enclose an angle in the range of 50° to 85°. In the case of smaller angles, a collision between the chain run that runs toward the chain guide and the chain section present between the chain guide rollers threatens to occur, if the chain is being shifted to chain sprockets that are smaller in diameter (i.e., have fewer teeth).

In the case of greater angles, insufficient guidance of the drive chain in the region of the chain guide threatens to occur if the active chain sprockets become larger and larger in diameter (i.e., have more teeth). This is because in the case of active chain sprockets that are relatively larger in diameter, lesser amounts of chain length is present in the chain guide, and therefore the chain guide must perform its original task of guiding the chain, using a chain section that is becoming shorter. This is because the looping angle at which the drive chain loops around the chain guide rollers, particularly the second chain guide roller, decreases with active chain sprockets that are increasingly larger in diameter. However, the greater this looping angle of the chain guide rollers, the better they are able to transfer force to the drive chain and to "guide" the drive chain.

An angle of 55° has proven to be particularly advantageous as the lower limit of the angle range of the angle that the stated connection planes enclose with one another. If the stated angle range preferably does not exceed 75°, or particularly preferably does not exceed 65°, reliable and reproducible shifting behavior can be obtained even for a large number of coaxial rear chain sprockets, using the inventive drive arrangement. The best results with regard to a difference in the number of teeth between the largest and the smallest sprocket and with regard to the possible number of sprockets on the common sprocket axis were achieved in an angle range of 55° to 60°, which the stated connection planes enclose with one another.

In order to prevent undesirable conditions from occurring at the rear chain guide, for example, where the second chain guide roller threatens to collide with the ground in specific shifting positions of the drive arrangement, attention should be paid to ensure that a first distance between the second chain guide roller axis and the tensioning pivot axis amounts to less than 2.5 times a second distance between the first chain guide roller axis and the tensioning pivot axis. An even greater ground clearance is obtained if the second distance amounts to less than 2.3 times the first distance.

In contrast, sufficient chain storage capacity is obtained if the second distance amounts to more than 1.3 times the first distance. The chain storage capacity is even greater if the second distance amounts to more than 1.6 times the first distance. This arrangement allows a greater number of rear chain sprockets and/or a greater difference in the number of teeth between the largest and the smallest rear chain sprocket.

An optimal compromise between chain storage capacity, on the one hand, and ground clearance, on the other hand, is obtained if the second distance amounts to more than 1.8 times but not more than twice the first distance.

To describe the arrangement of the tensioning device within the drive arrangement, it is advantageous to use an imaginary straight line that connects the sprocket axis and the chainring axis. A tensioning reference plane that contains the tensioning pivot axis and is orthogonal to the straight line should be added to the straight line on the sprocket and chain side, as a reference variable on the chain guide side.

An advantageously large but not overly large looping angle of the drive chain around the rear chain sprocket, i.e., an advantageous engagement length of the drive chain with the active sprocket, can then be obtained in that the rear chain guide is disposed in such a manner that the tensioning reference plane intersects the straight line in a region between the sprocket axis and the chainring axis.

An advantageous looping angle of the drive chain around active chain sprockets of more than 90° but less than 180°, preferably in the range of between 120° and 150°, particularly preferably in a range of 130° to 150°, can be obtained with a drive arrangement of the construction indicated above. The intersection point of the straight distance line with the tensioning reference plane should be at a distance from the sprocket axis by an amount between 16% and 12%, particularly between 10% and 6%, and preferably between 7% and 8% of the distance between the sprocket axis and the chainring axis.

The chain guide axis, which is usually located below the straight distance line between the sprocket axis and the chainring axis, is located on the movable member, so that the chain guide pivot axis has the same trajectory as the movable member itself during movement of the tensioning derailleur relative to the rear chain sprockets. Aside from a slight radial movement, this trajectory runs essentially mainly parallel to the sprocket axis. While the rear chain sprockets have a cone as the enveloping geometry, it is advantageous if, when the drive arrangement is viewed in the direction of the common sprocket axis, at least one articulation axis, preferably all the articulation axes, of the linkage run(s) between the sprocket axis, on the one hand, and not only the tensioning pivot axis but also the chainring axis, on the other hand. By means of this arrangement of the at least one articulation axis, the base member can be fixed in place on the sprocket axis itself. In this way, a sprocket axis component that is provided on the bicycle or on the drive arrangement in any case can also be used for accommodation and affixation of the base member, thereby reducing the number of components required for implementation of the drive arrangement being discussed in the present case.

In order to ensure that a sufficiently large chain length is always accommodated in the chain guide, in order to thereby make available sufficient chain guidance capacity of the rear derailleur, it can be provided that the distance between the chain guide roller axes is selected to be greater than 1.5 times and preferably selected to be greater than 1.8 times the sum of the tooth root radii of the two chain guide rollers.

In this connection, the distance from a chain guide roller axis to a root of a recess between two teeth of the same chain guide roller that directly follow one another shall be used as the tooth root radius.

The chain guide roller axis of the chain guide roller that is closer to the sprocket (the first guide roller) should preferably have the greatest possible radial movement component with reference to the sprocket axis and the smallest possible circumferential movement component, during pivoting of the tensioning device about the tensioning pivot axis. This arrangement brings about the greatest possible adjustment movement, taking into consideration the diameter changes of adjacent sprockets. This arrangement also brings about the smallest possible relative movement relative to the rear chain sprockets and the smallest possible distance between the tensioning pivot axis and the axis of the first guide roller. In this connection, a circumferential movement can make little to no contribution to the adjustment of the optimal free chain length between the first guide roller and the active sprocket, in each instance, in the case of a change in diameter of the active sprocket.

For this purpose, it is advantageous if the chain length and the distances between the chain guide roller axes and the tensioning pivot axis are selected in such a manner that the chain guide pivots by 100° to 140°, preferably by 110° to 130°, particularly preferably by 120° to 125° between its extreme positions.

The drive arrangement may be constructed in such a manner that the chain guide roller axis of the first guide roller, in its two extreme positions, i.e. from the smallest diameter sprocket to the largest diameter sprocket, is located in a sector which extends over an angle range about the sprocket axis that is less than 15°, preferably less than 10°, and particularly preferably less than 5°, as viewed in a plane that proceeds from the chain sprocket axis and is orthogonal to the chain sprocket axis. By means of this configuration of the drive arrangement, a particularly greater number of rear chain sprockets and/or a greater difference in the number of teeth between the largest and the smallest sprocket can still be reliably shifted.

To reliably ensure that the tensioning pivot axis has a trajectory mainly parallel to the sprocket axis during shifting movements of the tensioning derailleur, without the length of free chain becoming too great, the length of the links of the linkage is greater than half the free chain length between the first chain guide roller and the active sprocket and less than this free chain length.

The present drive arrangement particularly permits implementing any shifting process, in other words any change in the gear reduction or gear increase between the front chainring and the active rear chain sprocket, exclusively at the rear chain sprocket, so that the present drive arrangement can comprise a single front chainring.

In particular, the design being discussed here is particularly suitable for drive arrangements that comprise more than nine, particularly even more than ten or, in particular, precisely eleven coaxial rear sprockets, between which the drive chain can be shifted by means of the rear chain guide, to change the drive transmission ratio.

In this connection, the difference in the number of teeth between the rear sprocket with the most teeth and the rear sprocket with the least teeth can easily amount to more than 25 teeth. Differences in the number of teeth of more than 28 teeth between the largest rear sprocket and the smallest rear sprocket can also be reliably implemented. Even differences in the number of teeth of more than 30 teeth are possible. Most preferred is a difference of 32 teeth, which allows the implementation of not only gear reductions but also gear increases between the chainring and the active chain sprocket, so that such a drive arrangement can be used not only for uphill riding, but also for riding on level terrain and for fast downhill riding.

DETAILED DESCRIPTION OF THE INVENTION

In the following, reference will be made to FIGS. 1 to 7 jointly, for an explanation of the present invention. If individual figures are particularly suitable for a representation of the technical characteristics being described, at specific locations of the description, this will be separately emphasized.

In the figures, an embodiment of a drive arrangement of the present application, according to the invention, is referred to in general as 10.

Figure 1:
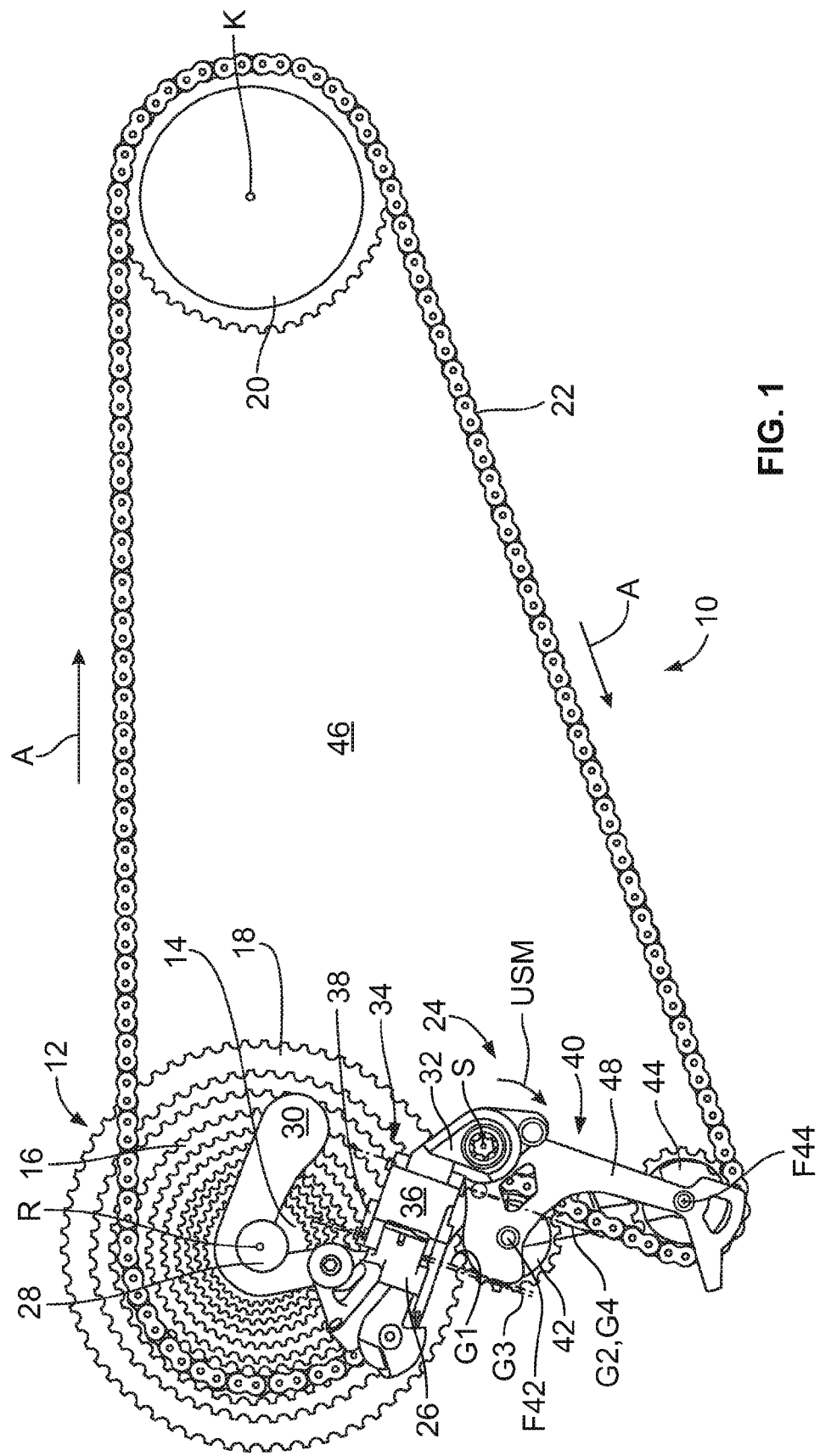
FIG. 1 is a side view of an embodiment according to the invention of a drive arrangement for a bicycle of the present application, when viewed in the direction of the sprocket axis.
Figure 2:
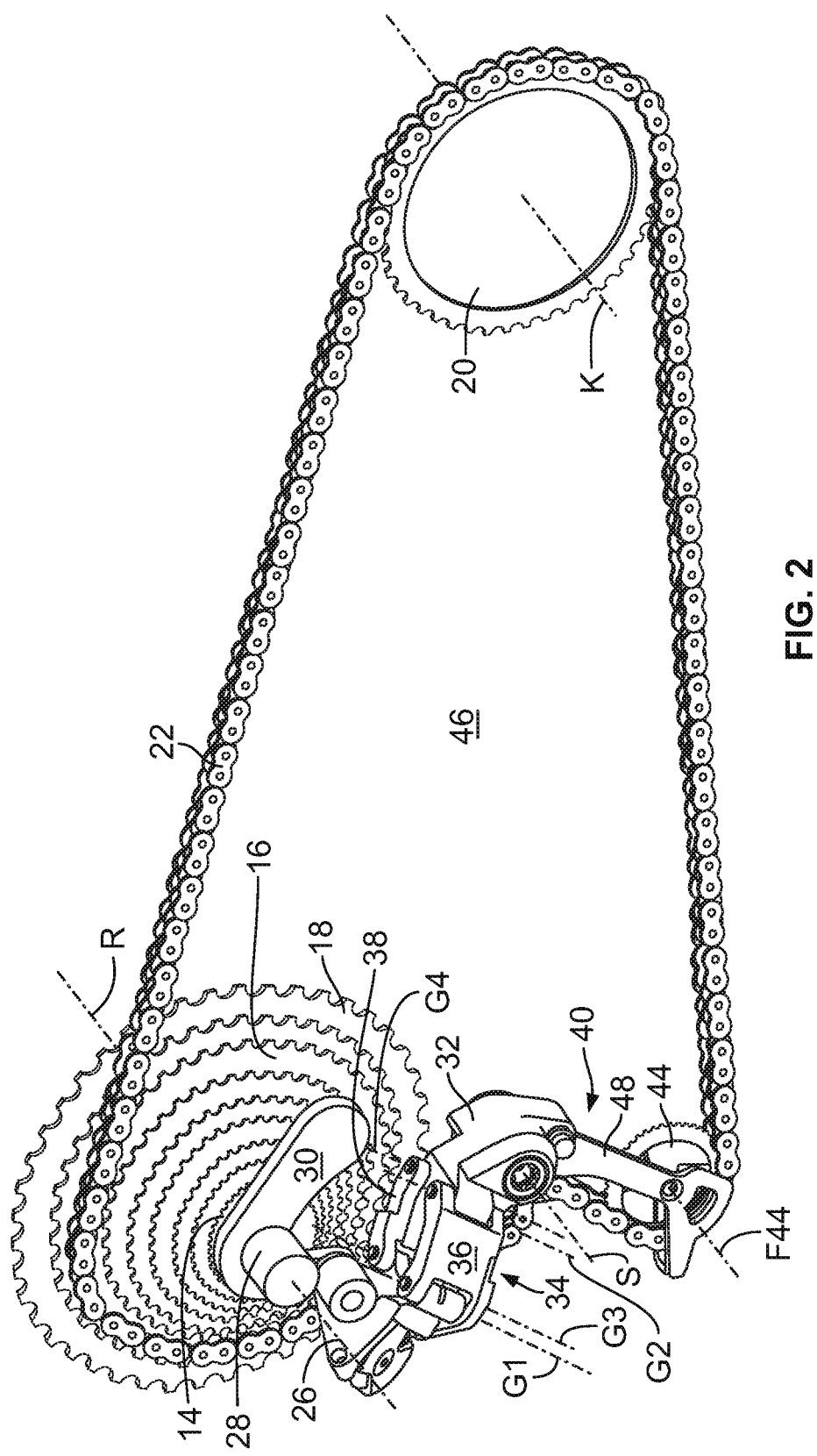
FIG. 2 is the embodiment of FIG. 1 in a perspective view.

The drive arrangement 10 comprises an arrangement 12 of sprockets that are coaxial with reference to a sprocket axis R. Sprocket axis R is orthogonal to the plane of the drawing of FIG. 1. Only the sprocket having the smallest diameter is identified with the reference symbol 14, the sprocket selected to be active in FIG. 1 is identified with the reference symbol 16, and the sprocket having the largest diameter is identified with the reference symbol 18. In the example shown in the figures, the arrangement 12 of the coaxial rear sprockets demonstrates eleven sprockets, of which each individual one differs from all the other sprockets of the arrangement 12 in terms of diameter and number of teeth. However, the number of sprockets of the arrangement 12 can be different from eleven, and can also comprise 9, 10, 12, 13, or more sprockets. In the example shown, the difference in the number of teeth between the smallest sprocket 14 and the largest sprocket 18 amounts to 32 teeth, although the difference in the number of teeth between the smallest sprocket 14 and the largest sprocket 18 can also be less than or greater than 32.

The arrangement 12 of coaxial rear sprockets is preferably provided on a rear wheel of a bicycle, for the transmission of drive torque to this wheel.

Furthermore, the arrangement 10 comprises a front chainring 20 that can be provided on a bottom bracket of a bicycle as is well known. The front chainring 20 rotates about a chainring axis K that lies orthogonal to the drawing plane of FIG. 1, where introduction of torque to the chainring can take place in known manner, by means of crank arms (not shown) connected so as to rotate with the chainring 20.

A drive chain 22, which can be configured, for example, in a known manner, as a roller chain having inner and outer plates that alternate in the chain running direction, is in meshing engagement with an active sprocket 16 of the arrangement 12 and with the front chainring 20 in FIG. 1.

The drive chain 22 passes through a rear chain guide 24 on its way from the chainring 20 to the sprocket arrangement 12, which guide can be attached, in advantageous manner, to a sprocket axle component 28 with a base part 26, by means of a known attachment device 30. In this way, no separate holder is required for the affixation component 26 of the rear chain guide 24 on the bicycle, (not shown). Nevertheless, attachment of the rear chain guide 24 can also take place on the bicycle itself, for example on the rear fork dropout, a hanger or the like.

The rear chain guide 24 has a movable member 32 that can be moved relative to the base part 26, which part is articulated onto the base part by way of a linkage or parallelogram four-pivot articulation 34. The linkage 34 includes two parallelogram connecting rods or outer and inner links 36 and 38.

A tensioning device 40 is articulated onto the movable member 32 so as to pivot about a tensioning pivot axis S. Preferably, the tensioning device 40 is biased with a chain tensioning moment KSM that acts about the tensioning pivot axis S, which moment acts, in the configuration shown in the exemplary embodiment, in the drive direction of rotation of the chain according to arrow A, about the tensioning pivot axis S. Therefore the drive chain 22 is tensioned independent of the selected active sprocket, in each instance. The tensioning device 40 may be thought of as the chain guide 24 and a biasing member. For purposes of this disclosure, the tensioning device may also be referred to as a chain guide.

In the exemplary embodiment discussed, the front chainring 20 may be the only chainring, so that any change in a gear increase or gear reduction of the drive force that is introduced into the chainring 20 in known manner can take place solely by means of the selection of a sprocket from the sprocket arrangement 12 as the active sprocket that meshes with the drive chain 22.

The tensioning device 40, together with the movable member 32, forms a tensioning derailleur that can be moved essentially parallel to the sprocket axis R. The tensioning device 40 is moved by the relative movement of the movable member 32 relative to the sprocket arrangement 12, which movement is made available by the parallelogram four-pivot articulation 34, in order to bring the drive chain 22 into meshing engagement with a desired sprocket of the sprocket arrangement 12.

The articulation axes G1 to G4 of the parallelogram four-pivot articulation 34 run essentially orthogonal to the sprocket axis R. Therefore, the axes G1 to G4, in the finished, assembled state, are generally parallel to a longitudinal center plane of a bicycle that carries the drive arrangement 10 being discussed here.

Preferably, the articulation axes G1 to G4 are disposed in such a manner that there is at least one articulation axis, preferably all the articulation axes G1 to G4 are disposed, when viewing the drive arrangement 10 in a projection along the sprocket axis, in such a manner that the sprocket axis R is located on one side of the at least one articulation axis G1 to G4. The tensioning pivot axis S as well as the chainring axis K are situated on the other side, in each instance, of the at least one articulation axis G1 to G4.

The tensioning device 40 has a first chain guide roller 42 and a second chain guide roller 44. The first chain guide roller 42 is disposed, in the exemplary embodiment shown, outside the area 46 enclosed by the drive chain 22. The second chain guide roller 44 is disposed within this same area 46. The two chain guide rollers 42 and 44 are coupled, preferably in meshing engagement with the drive chain 22.

Figure 3:
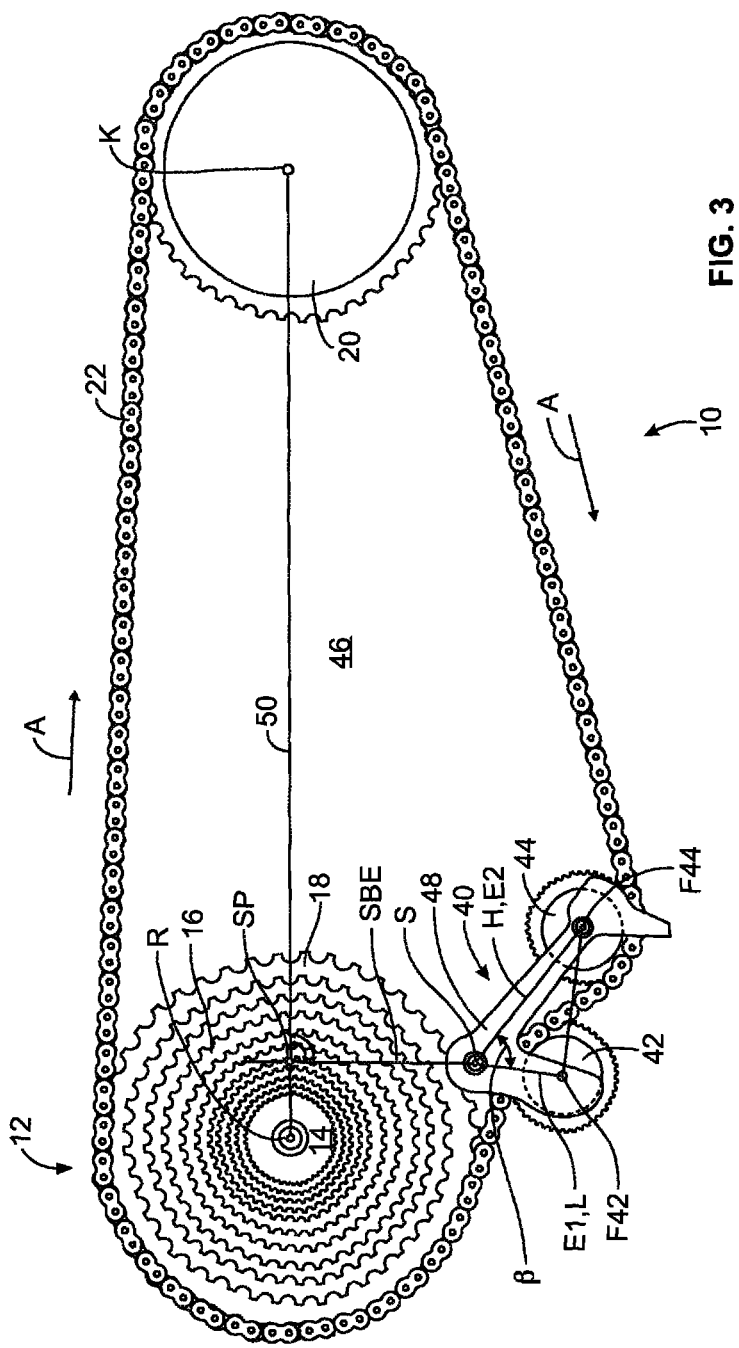
FIG. 3 is a simplified representation of the embodiment of FIG. 1 and FIG. 2 when the sprocket having the largest diameter is selected as the active sprocket.
Figure 4:
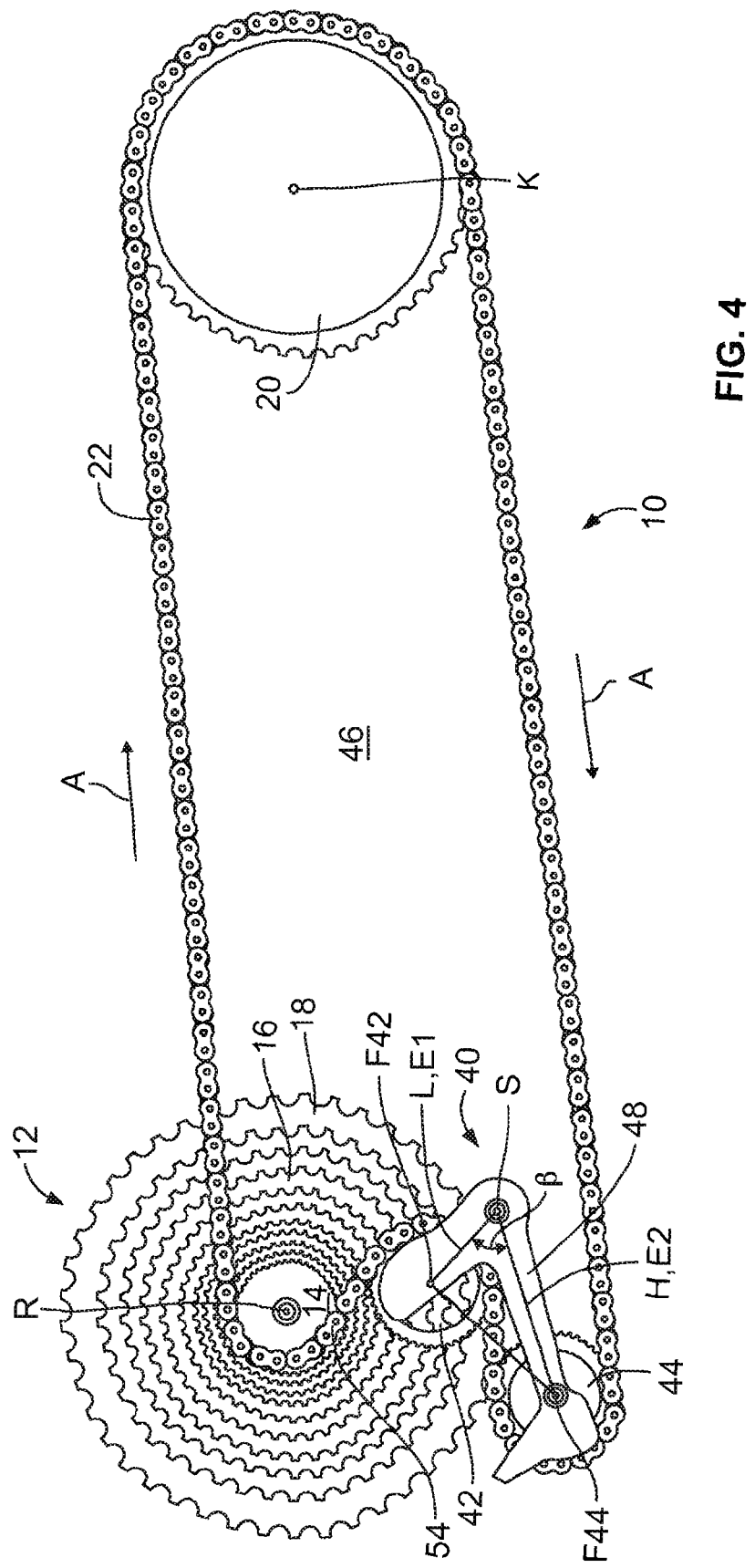
FIG. 4 is a simplified elevation view of FIG. 3 with the smallest sprocket as the active sprocket.

The first chain guide roller 42 is the chain guide roller from which the drive chain 22 runs off, as the last thing, during movement in the drive direction of rotation A, before it reaches the selected active sprocket, for example sprocket 16 in FIG. 1, sprocket 18 in FIG. 3, and sprocket 14 in FIG. 4. Accordingly, the first chain guide roller 42 is the chain guide roller that is closer to the sprocket. The second chain guide roller 44 will be understood to mean the chain guide roller that is farther away from the sprocket.

The two chain guide rollers 42 and 44 respectively rotate about chain guide roller axes F42 and F44. The chain guide roller axes F42 and F44 lie parallel to one another and to the tensioning pivot axis S and are different from the tensioning pivot axis S.

For the sake of clarity, reference is made to FIGS. 3 and 4, in order to describe the geometric relationships at the tensioning device 40 in greater detail.

The chain guide rollers 42 and 44 may be connected with one another by means of a common cage component 48, and accommodated on the latter so as to rotate. The cage component 48 can then, in turn, be attached to the movable member 32, so as to pivot about the tensioning pivot axis S, and with the bias indicated above. Thus, the two chain guide rollers 42 and 44 can be fixed in place on the rear chain guide 24, relative to the movable member 32, using a single attachment.

The distances between the chain guide roller axes F42 and F44 relative to one another and relative to the tensioning pivot axis S can be easily kept constant, in this manner. For example, the chain guide roller axis F42 of the first chain guide roller 42 has a distance L from the tensioning pivot axis S that is shorter than the distance H between the chain guide roller axis F44 of the second chain guide roller 44 and the tensioning pivot axis S.

In this way, a sufficient radial adjustment movement toward the sprockets and away from them can be achieved with the first chain guide roller 42, during selection of each of the eleven sprockets, shown here as examples, as the active sprocket. At the same time, sufficient chain length can be stored or accommodated in the section between the first chain guide roller 42 and the second chain guide roller 44, if the active chain sprocket has a very small diameter. An example of a small diameter sprocket is shown where the drive chain 22 is in engagement with the sprocket 14. Accordingly, the engagement length of the drive chain 22 with this sprocket 14 is very short, as can be seen in the example of the operating state of the drive arrangement 10 in FIG. 4.

Figure 5:
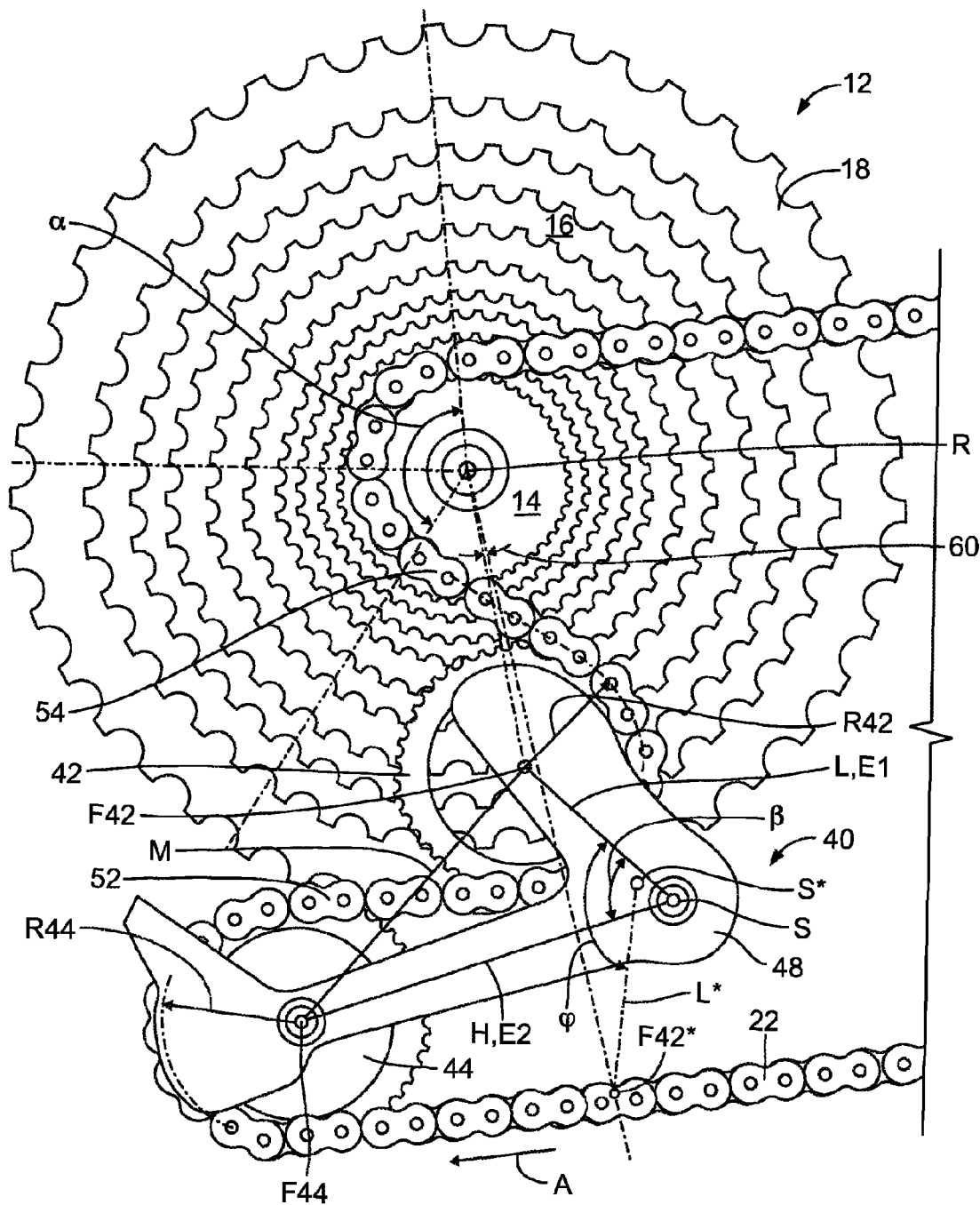
FIG. 5 is an enlarged detail view of FIG. 4, which shows the arrangement of coaxial rear wheel sprockets with the sprocket that is smallest in diameter as the active sprocket and the tensioning device, where in addition, the position of the tensioning device is shown for the case that, as in FIG. 3, the sprocket that is largest in diameter is selected as the active sprocket.
Figure 6:
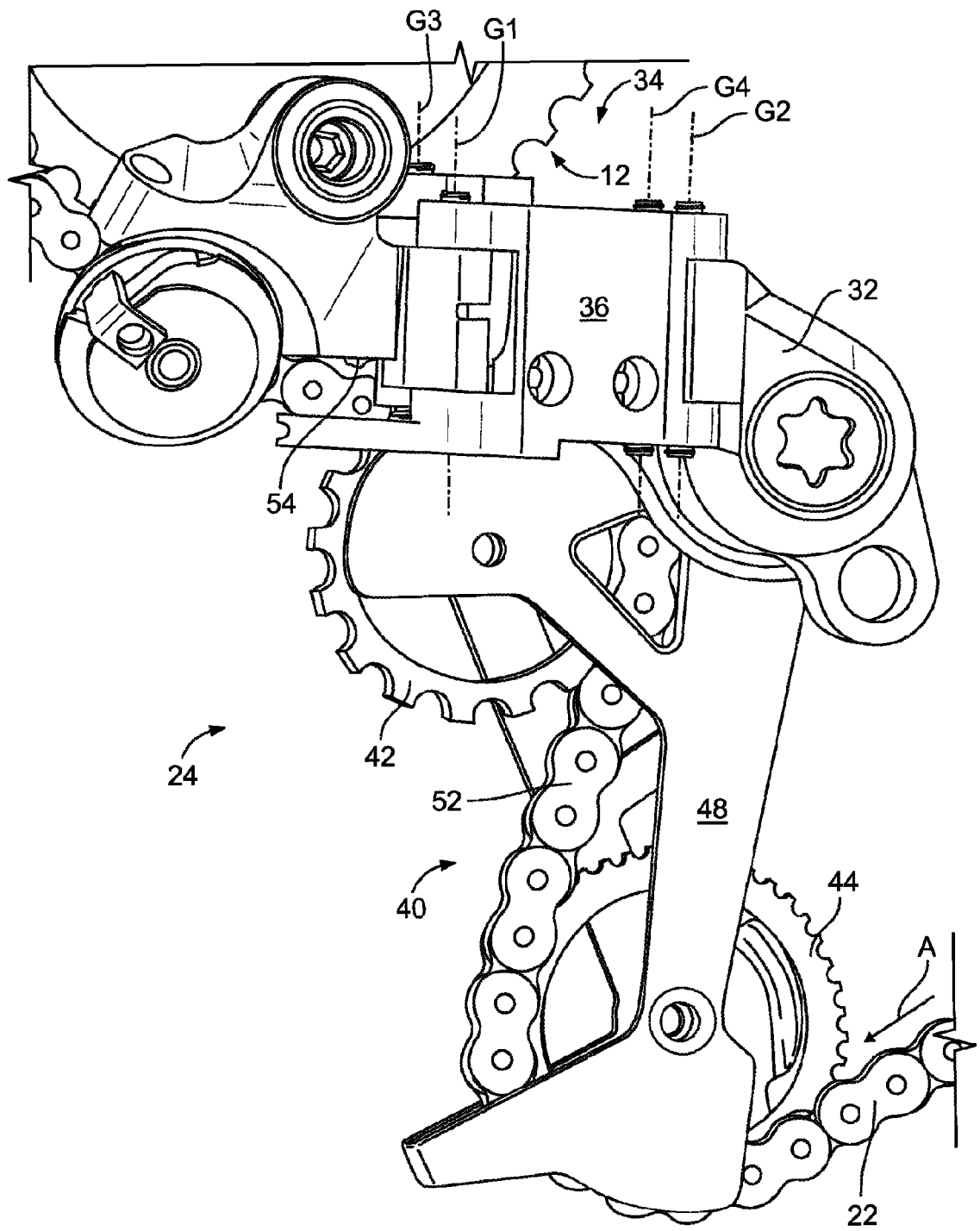
FIG. 6 is an enlarged view of the rear chain guide, as shown in FIG. 1.
Figure 7:
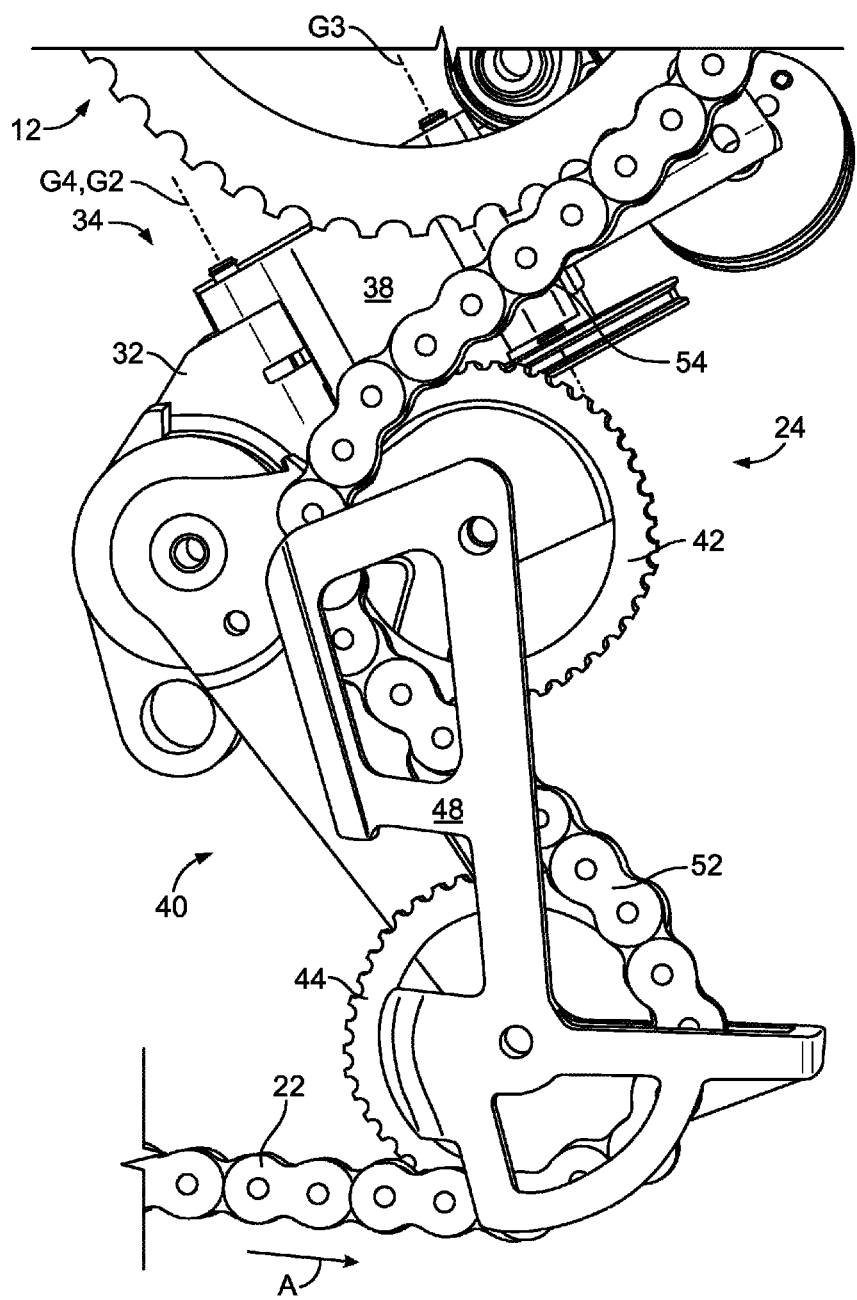
FIG. 7 is a view of the back side of the rear chain guide from FIG. 6.

The axes that are parallel to one another: tensioning pivot axis S and chain guide roller axis F42 span a first plane E1, orthogonal to the drawing plane of FIGS. 1, 3, 4, and 5, the projection of which plane coincides with the distance dimension L in FIGS. 3 to 5 of the present application.

Likewise, the essentially parallel axes: tensioning pivot axis S and chain guide roller axis F44 span a second plane E2, which also runs orthogonal to the drawing planes of FIGS. 1 and 3 to 5, and therefore their projection coincides with the distance dimension H in the said figures.

The planes E1 and E2 formed in this way enclose an angle β that has a value in a range of 50° to 85°, preferably in a range of 55° to 75°, and particularly preferably of 55° to 65°. In the example shown in the present figures, the angle β has a value of about 60°.

With this use of an acute angle between the connection planes E1 and E2, the length of the distance H can be made large. Thus, correspondingly large chain lengths can be accommodated in the tensioning device 40 (see FIG. 4). This prevents a bicycle that carries the arrangement 10 from losing an unreasonable amount of ground clearance or having to risk a collision of sections of the circulating drive chain 22 in the region of the tensioning device 40.

A length ratio of the distances H to L in the range of 1.8 to 2.0 has proven to be particularly advantageous. In the exemplary embodiment shown here, the distance H between the chain guide roller axis F44 and the tensioning pivot axis S is about 1.93 times greater than the distance L between the chain guide roller axis F42 and the tensioning pivot axis S.

In FIG. 3, for further clarification of the arrangement relationship between the rear chain guide 24 and the arrangement 12 of the rear sprockets, a tensioning reference plane SBE is shown in the drawing, which contains the tensioning pivot axis S and, accordingly, is oriented orthogonal to the drawing plane of FIG. 3.

This tensioning reference plane SBE is furthermore a vertical plane on a straight distance line 50, which connects the two axes: sprocket axis R and chainring axis K, with one another.

As can be seen in FIG. 3, the tensioning reference plane intersects the straight line preferably in a region between the axes that define the straight line 50, i.e., chainring axis K and sprocket axis R. The distance between the intersection point SP that the tensioning reference plane SBE forms with the straight line 50 and the sprocket axis R is less than 10% and greater than 8% of the distance between the sprocket axis R and the chainring axis K. In this case, the tensioning pivot axis S is disposed in a particularly advantageous region, so that the drive chain 22 can be laid onto each individual sprocket, even on sprocket arrangements 12 having eleven or more sprockets.

As can furthermore be seen in FIG. 5, the distance M between the chain guide roller axes F42 and F44 amounts to about 1.5 times the sum of the tooth root radius R42 of the first chain guide roller 42 and the tooth root radius R44 of the second chain guide roller 44. In this way, it can be ensured that a sufficiently long section 52 of the drive chain 22 is present between the chain guide rollers 42 and 44, in order to provide optimal chain guidance by the rear chain guide 24.

Furthermore, in FIG. 5, the straight distance line L between the tensioning pivot axis S and the chain guide roller axis F42 is additionally shown in the position that it assumes when the largest diameter sprocket 18 is selected as the active sprocket (compare with FIG. 3). The orientation of the distance L in the position with the largest active sprocket is indicated with L* in FIG. 5.

The line (L) reaches from a location S*, which indicates the position of the tensioning pivot axis S when the active sprocket 18 is selected, all the way to a location F42\*, which corresponds to the position of the chain guide roller axis F42 when the active sprocket 18 is selected.

Ignoring the displacement of the tensioning pivot axis S in the case of an adjustment of the rear chain guide 24 between its two extreme positions, shown in FIG. 5 and in FIG. 3, the tensioning device 40 pivots, during this displacement, about the angle φ, which amounts to about 125° in the example shown. Therefore, even in the case of a not overly expansive length L between the tensioning pivot axis S and the chain guide roller axis F42 of the first chain guide roller 42, a sufficiently great radial adjustment path (with reference to the sprocket axis R) can be implemented by the rear derailleur. Thus, the drive chain 22 can be shifted between a plurality of sprockets and/or between sprockets having a relatively great difference, in other words a difference greater than 25 teeth between the largest and the smallest sprockets. In this connection, then, a larger radial setting path, with reference to the sprocket axis R, of the first chain guide roller 42 can be implemented. This can be accomplished if the length of the drive chain 22 is dimensioned in such a manner and the rear chain guide 24 is positioned in such a manner that the chain guide roller axis F42, in the two extreme positions of the tensioning device 40 and the active sprocket 18 that has the largest diameter, on the other hand, when viewing the drive arrangement 10 along the sprocket axis R, is located in a sector viewed in a plane that proceeds from the sprocket axis R and lies orthogonal to the sprocket axis R. Also, the angle expanse of the sector is preferably less than 7.5°, particularly preferably less than 5°, and, in the example shown, actually less than 4°.

With the arrangement described here, a free chain section 54 between the chain guide roller 42 that is closer to the sprocket and the active sprocket (in FIG. 5: sprocket 14) can be kept approximately constant, independent of the active sprocket that is selected. At the same time, the length of the free chain section 54 is not so short that the drive chain 22 can no longer be reliably shifted from an active sprocket to the next-larger inactive sprocket, and not so long that the chain section 54 merely deforms in the case of a movement of the tensioning derailleur of the rear chain guide 24, without shifting the chain 22 to the next-larger sprocket.

At the same time, the result can be achieved that the drive chain 22 is in meshing engagement along an angle range of 110° to 180°, preferably of 120° to 160°, so that sufficient drive force can be transferred to the rear bicycle wheel that is connected with the sprocket arrangement 22, so as to transfer torque, by way of the drive chain 22.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:
1. Drive arrangement for a bicycle, comprising:
a chainring having a chainring axis,
a plurality of rear sprockets having different diameters and different numbers of teeth, the plurality of rear sprockets sharing a sprocket axis,
a drive chain engaging the rear sprockets and the chainring and in meshing engagement with a selected active sprocket of the plurality of rear sprockets and the chainring, and
a rear derailleur, including:
  a base part that is fixable to the bicycle,
  a movable member,
  a linkage interconnecting the base part and the movable member to allow movement of the movable member relative to the base part, the linkage including four parallel linkage axes,
  a rear chain guide pivotally disposed on the movable member to receive the drive chain, the rear chain guide movable along a direction parallel to the sprocket axis to move the drive chain between the plurality of rear sprockets, the rear chain guide including a first guide roller and a second guide roller, the first guide roller positioned closer to the rear sprockets than the second guide roller, each of the first and second guide rollers having a respective guide roller axis essentially parallel to one another and to the sprocket axis,
  the rear chain guide pivotable about a tensioning pivot axis that is parallel to the first and second guide roller axes and biased by a chain tensioning moment that acts about the tensioning pivot axis, wherein the four axes of the linkage are oriented orthogonally to the direction parallel to the sprocket axis, independent of the selected relative position of the rear chain guide, wherein the first guide roller axis and the tensioning pivot axis are spaced apart by a first distance and the second guide roller axis and the tensioning pivot axis are spaced apart by a second distance, the first distance shorter than the second distance, and
  a first connection plane, which contains the first guide roller axis and the tensioning pivot axis, defines an angle with a second connection plane, which contains the second guide roller axis and the tensioning pivot axis, of about 50° to about 85°.

2. A drive arrangement according to claim 1, wherein the angle between the first connection plane and second connection plane is from about 55° to about 75°.

3. A drive arrangement according to claim 2, wherein the angle between the first connection plane and second connection plane is from about 55° to about 65°.

4. A drive arrangement according to claim 3, wherein the angle between the first connection plane and second connection plane is from about 55° to about 60°.

5. A drive arrangement according to claim 1, wherein the second distance is between about 2.5 times and about 1.3 times the first distance.

6. A drive arrangement according to claim 5, wherein the second distance is between about 2.3 times and about 1.6 times the first distance.

7. A drive arrangement according to claim 6, wherein the second distance is between about 2 times and about 1.8 times the first distance.

8. A drive arrangement according to claim 1, wherein a tensioning reference plane that contains the tensioning pivot axis and is orthogonal to a straight line that connects the sprocket axis and the chainring axis intersects the straight line at a point between the sprocket axis and the chainring axis.

9. A drive arrangement according to claim 8, wherein the point of intersection of the straight line is spaced from the sprocket axis by less than about 16% and greater than about 6% of a third distance between the sprocket axis and the chainring axis.

10. A drive arrangement according to claim 9, wherein the point of intersection of the straight line is spaced from the sprocket axis by less than about 12% and greater than about 7% of a third distance between the sprocket axis and the chainring axis.

11. A drive arrangement according to claim 10, wherein the point of intersection of the straight line is spaced from the sprocket axis by less than about 10% and greater than about 8% of a third distance between the sprocket axis and the chainring axis.

12. A drive arrangement according to claim 1, wherein a fourth distance between the guide roller axes is greater than 1.5 times the sum of the tooth root radii of the first and second guide rollers.

13. A drive arrangement according to claim 12, wherein a fourth distance between the guide roller axes is greater than 1.8 times the sum of the tooth root radii of the first and second guide rollers.

14. A drive arrangement according to claim 1, wherein the chain has a selected length and the first and second guide roller axes and the tensioning pivot axis are positioned such that the rear chain guide pivots about 100° to 140° when moved between a largest and a smallest of the plurality of sprockets.

15. A drive arrangement according to claim 14, wherein the chain has a selected length and the first and second guide roller axes and the tensioning pivot axis are positioned such that the rear chain guide pivots about 110° to 130° when moved between a largest and a smallest of the plurality of sprockets.

16. A drive arrangement according to claim 15, wherein the chain has a selected length and the first and second guide roller axes and the tensioning pivot axis are positioned such that the rear chain guide pivots about 120° to 125° when moved between a largest and a smallest of the plurality of sprockets.

17. A drive arrangement according to claim 1, wherein the linkage is longer than half the free chain length between the first guide roller and the active sprocket and shorter than the free chain length.

18. A drive arrangement according to claim 1, wherein the drive arrangement includes only one chainring.

19. A drive arrangement according to claim 1, including one of nine, ten, and eleven coaxial rear sprockets.

20. A drive arrangement according to claim 1, wherein the one of the plurality of rear sprockets that has the most teeth has more than 25 more teeth than the one of the plurality of rear sprockets that has the least teeth.

21. A drive arrangement according to claim 1, wherein the one of the plurality of rear sprockets that has the most teeth has more than 28 more teeth than the one of the plurality of rear sprockets that has the least teeth.

22. A drive arrangement according to claim 21, wherein the one of the plurality of rear sprockets that has the most teeth has more than 30 more teeth than the one of the plurality of rear sprockets that has the least teeth.

23. A drive arrangement according to claim 22, wherein the one of the plurality of rear sprockets that has the most teeth has more than 32 more teeth than the one of the plurality of rear sprockets that has the least teeth.

\* \* \* \* \*